US006760843B1

(12) United States Patent
Carter

(10) Patent No.: US 6,760,843 B1
(45) Date of Patent: Jul. 6, 2004

(54) MAINTAINING A SOFT-TOKEN PRIVATE KEY STORE IN A DISTRIBUTED ENVIRONMENT

(75) Inventor: Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 394 days.

(21) Appl. No.: 09/660,903

(22) Filed: Sep. 13, 2000

Related U.S. Application Data

(63) Continuation of application No. 09/059,137, filed on Apr. 13, 1998.
(60) Provisional application No. 60/071,989, filed on Jan. 20, 1998.

(51) Int. Cl.[7] .............................................. H04L 9/00
(52) U.S. Cl. ...................... 713/200; 713/150; 713/175
(58) Field of Search ................................. 713/200, 201, 713/202, 161, 150–151, 170–171, 175–177

(56) References Cited

U.S. PATENT DOCUMENTS

| | | | |
|---|---|---|---|
| 4,203,166 A | 5/1980 | Ehrsam et al. .................. 375/2 |
| 4,238,853 A | 12/1980 | Ehrsam et al. .................. 375/2 |
| 4,281,216 A | 7/1981 | Hogg et al. .............. 178/22.08 |
| 4,315,101 A | * 2/1982 | Atalla ..................... 178/22.08 |
| 4,386,233 A | 5/1983 | Smid et al. .............. 178/22.08 |
| 4,578,531 A | 3/1986 | Everhart et al. ......... 178/22.08 |
| 4,688,250 A | 8/1987 | Corrington et al. ........... 380/23 |
| 4,731,840 A | 3/1988 | Mniszewski ................. 380/21 |
| 4,771,459 A | 9/1988 | Jansen ......................... 380/21 |
| 4,868,877 A | 9/1989 | Fischer ........................ 380/25 |
| 4,876,716 A | 10/1989 | Okamoto ..................... 380/21 |
| 4,910,773 A | 3/1990 | Hazard et al. ................ 380/21 |
| 4,912,762 A | 3/1990 | Lee et al. ..................... 380/24 |
| 5,081,678 A | 1/1992 | Kaufman et al. ............. 380/21 |
| 5,146,497 A | 9/1992 | Bright ......................... 380/21 |
| 5,146,498 A | 9/1992 | Smith .......................... 380/21 |
| 5,150,408 A | 9/1992 | Bright ......................... 380/21 |
| 5,164,986 A | 11/1992 | Bright ......................... 380/21 |
| 5,185,795 A | 2/1993 | Bright ......................... 380/21 |
| 5,208,859 A | 5/1993 | Bartucci et al. .............. 380/45 |
| 5,265,164 A | 11/1993 | Matyas et al. ................ 380/30 |
| 5,299,263 A | 3/1994 | Beller et al. ................. 380/30 |
| 5,325,432 A | 6/1994 | Gardeck et al. ............. 380/21 |
| 5,341,426 A | 8/1994 | Barney et al. ................ 380/21 |
| 5,349,642 A | 9/1994 | Kingdon ...................... 380/25 |

(List continued on next page.)

OTHER PUBLICATIONS

Wilson, Stephen: Certificates and trust in electronic commerce; 1997 MCB UP Limited, vol. 5, issue 5, p. 175–181.*
Sterizich, Martha: Connect your LANs; San Francisco, Aug. 1994 MacWorld Communications, Inc. vol. 11, Issue 8, p. 152–155.*
Atalla Licenses Toolkit For Security Chip; Stillwater, Feb. 1997 Newsbytes News Network. p. 1.*
Sirbu et al., "Distibuted Authentication in Kerberos Using Public Key Cryptography," Mar. 1995.
Schneier, *Applied Cryptography*, 1994, pp. 139–153.
Neumann, "Crypto Key Management," Aug. 1997.

(List continued on next page.)

*Primary Examiner*—Kim Vu
*Assistant Examiner*—Leynna Ha
(74) *Attorney, Agent, or Firm*—Marger Johnson & McCollom

(57) ABSTRACT

Methods, systems, and devices are provided for securely updating private keys, key pairs, passwords, and other confidential information in a distributed environment. A transaction is created including appropriate encrypted soft-token content, and then transmitted to a new ocation. Comparisons are made to determine whether the new soft-token content should be recognized as authentic and entered at the new location. Updates are accomplished without ever sending the plain text form of a key or a password across the wire between the distributed locations.

27 Claims, 5 Drawing Sheets

U.S. PATENT DOCUMENTS

| | | | |
|---|---|---|---|
| 5,381,479 A | 1/1995 | Gardeck et al. | 380/21 |
| 5,404,404 A | 4/1995 | Novorita | 380/21 |
| 5,418,854 A | 5/1995 | Kaufman et al. | |
| 5,428,738 A | 6/1995 | Carter et al. | 395/161 |
| 5,471,532 A | 11/1995 | Gardeck et al. | 380/21 |
| 5,481,612 A * | 1/1996 | Campana et al. | 380/25 |
| 5,491,750 A | 2/1996 | Bellare et al. | 380/21 |
| 5,553,139 A | 9/1996 | Ross et al. | 380/4 |
| 5,553,143 A | 9/1996 | Ross et al. | 380/25 |
| 5,572,528 A | 11/1996 | Shuen | 370/85.13 |
| 5,611,048 A | 3/1997 | Jacobs et al. | 395/200.09 |
| 5,633,931 A | 5/1997 | Wright | 380/25 |
| 5,651,066 A | 7/1997 | Moriyasu et al. | 380/21 |
| 5,671,414 A | 9/1997 | Nicolet | 395/684 |
| 5,675,649 A | 10/1997 | Brennan et al. | 380/21 |
| 5,687,235 A | 11/1997 | Perlman et al. | 380/25 |
| 5,692,129 A | 11/1997 | Sonderegger et al. | 395/200.11 |
| 5,719,786 A | 2/1998 | Nelson et al. | 364/514 |
| 5,719,941 A | 2/1998 | Swift et al. | 380/25 |
| 5,734,718 A * | 3/1998 | Prafullchandra | 380/4 |
| 5,818,936 A | 10/1998 | Mashayekhi | 380/25 |
| 6,061,799 A * | 5/2000 | Eldridge et al. | 713/202 |
| 6,085,320 A * | 7/2000 | Kaliskki, Jr. | 713/168 |
| 6,311,194 B1 | 10/2001 | Sheth et al. | 707/505 |

OTHER PUBLICATIONS

Denning et al., "A Taxonomy for Key Escrow Encryption Systems," Mar. 1996.

Bellare et al., "Provably Secure Key Distribution—The Three Party Case," 1995.

Bird et al., "The KryptoKnight Family of Light–Weight Protocols for Authentication and Key Distribution," Feb. 1995.

Reiter, "Distributing Trust with the Rampart Toolkit," Apr. 1996.

Medvinsky et al., "Public Key Utilizing Tickets for Application Servers (PKTAPP)," Jan. 1997.

Menezes et al., Handbook of Applied Cryptography, Oct. 17, 1996, pp. 388–393, 425–428, 430, 434, 452, 546–550, 553–556 and 559–561.

Garfinkel, PGP: Pretty Good Privacy, 3/95 pp. 153, 177, 178.

* cited by examiner

MAINTAINING A SOFT-TOKEN PRIVATE KEY STORE IN A DISTRIBUTED ENVIRONMENT

RELATED APPLICATIONS

This application is a continuation of application Ser. No. 09/059,137 filed Apr. 13, 1998, which is incorporated herein by reference.

RELATED APPLICATIONS

This application claims the benefit of commonly owned copending U.S. patent application. Ser. No. 60/071,989 filed Jan. 20, 1998.

FIELD OF THE INVENTION

The present invention relates to maintaining security information in a distributed environment, and relates more particularly to updating passwords and private keys in a computer network.

TECHNICAL BACKGROUND OF THE INVENTION

Internal business networks, global computer networks, loosely- or tightly-coupled groups of networks, devices linked by wireless connections, mobile computers, and other distributed environments are becoming more important than ever to individuals, businesses, government agencies, and other entities. Distributed environments are also becoming more diverse in their geography, data format, hardware configuration, software platform, and other characteristics. As a result, security concerns are becoming both more important and more complex.

Keys and passwords protecting those keys are widely used to control access to data and other resources in a distributed environment. Keys are often used for authenticating user requests, for encrypting and decrypting digital documents, and for creating and verifying digital signatures on digital documents. Keys include symmetric keys, and asymmetric keys such as public-private key pairs. A given symmetric key may be used, for instance, both to encrypt a document and to decrypt the encrypted document.

If a public key is used to encrypt a document, then the private key must be used to decrypt the encrypted document. Public-private key pairs are also useful for digitally signing documents and verifying such digital signatures. Passwords control access to keys and thus act as keys in their own right. Indeed, a key may be used as a password and vice versa.

Keys may be embedded in tokens. Tokens may be "hard" or "soft". A hard token is a physical device, such as a dongle, a magnetic card, or a PCMCIA card, which must be physically presented to the distributed environment at a particular location in order to gain access to resources through that location. There are generally few or no duplicate copies of a key in a hard token, and the key data is normally restricted to the location at which the hard token is presented.

By contrast, a soft-token is a computer data structure, that is, a collection of digital information organized in a particular way to be recognized and otherwise processed by a computer. If the key is part of a public-private key pair, then the token may include a certificate for authenticating the key. Soft-tokens may be copied and distributed to many locations in the environment, making it unnecessary for the key's owner to be physically present at a hard-token-ready machine to present the token. Soft-token distribution is accomplished using network connections, memory copies, and similar operations.

In the absence of security concerns, soft-tokens would be easier to work with than hard tokens: they are cheaper to make, easier to transport, easier to store, and easier to modify. Unfortunately, these same characteristics make soft-tokens vulnerable to security breaches. Unless appropriate steps are taken, fake keys and passwords can be made and substituted for authorized keys and passwords, and authorized keys and passwords can be modified to grant access to unauthorized entities.

In particular, some assurance of authenticity is needed when a new key or a new password arrives at a location to be entered as the replacement for the current key or current password. Otherwise one is forced to choose between forbidding changes to keys and passwords, on the one hand, and risking unauthorized access after a key or password is updated, on the other. Forbidding changes makes the distributed environment much less convenient and effective for administrators and other users. Accordingly, novel systems, devices, and methods for secure key and password updates are disclosed and claimed herein.

BRIEF SUMMARY OF THE INVENTION

The present invention provides methods, systems, and devices for maintaining a soft-token store. In particular, the invention provides tools for securely updating private keys, passwords, and other confidential information in a distributed environment. One method of the invention updates a password which protects a key stored in the distributed environment. According to this method, a user's current password and new password are first obtained. Next a transaction is created including at least a current-password-encrypted-key (formed by encrypting the user's key using the current password) and a new-password-encrypted-key (formed by encrypting the user's key using the new password). The transaction is sent to an update location in the distributed environment which does not yet recognize the new password. The update location may not recognize any password for the user as yet, or it might only recognize a previously supplied different password. Regardless, the current-password-encrypted-key in the transaction is compared with a current-password-encrypted-key previously stored at the update location to determine whether they are equivalent. If they are, then the new-password-encrypted-key is entered at the update location so that the new password will be recognized there. This is accomplished without ever sending the plain text form of the key or the password across the "wire" between the distributed locations.

A related method of the invention updates a user's key in the distributed environ-ment without sending the plain text form of a key or password across the wire. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
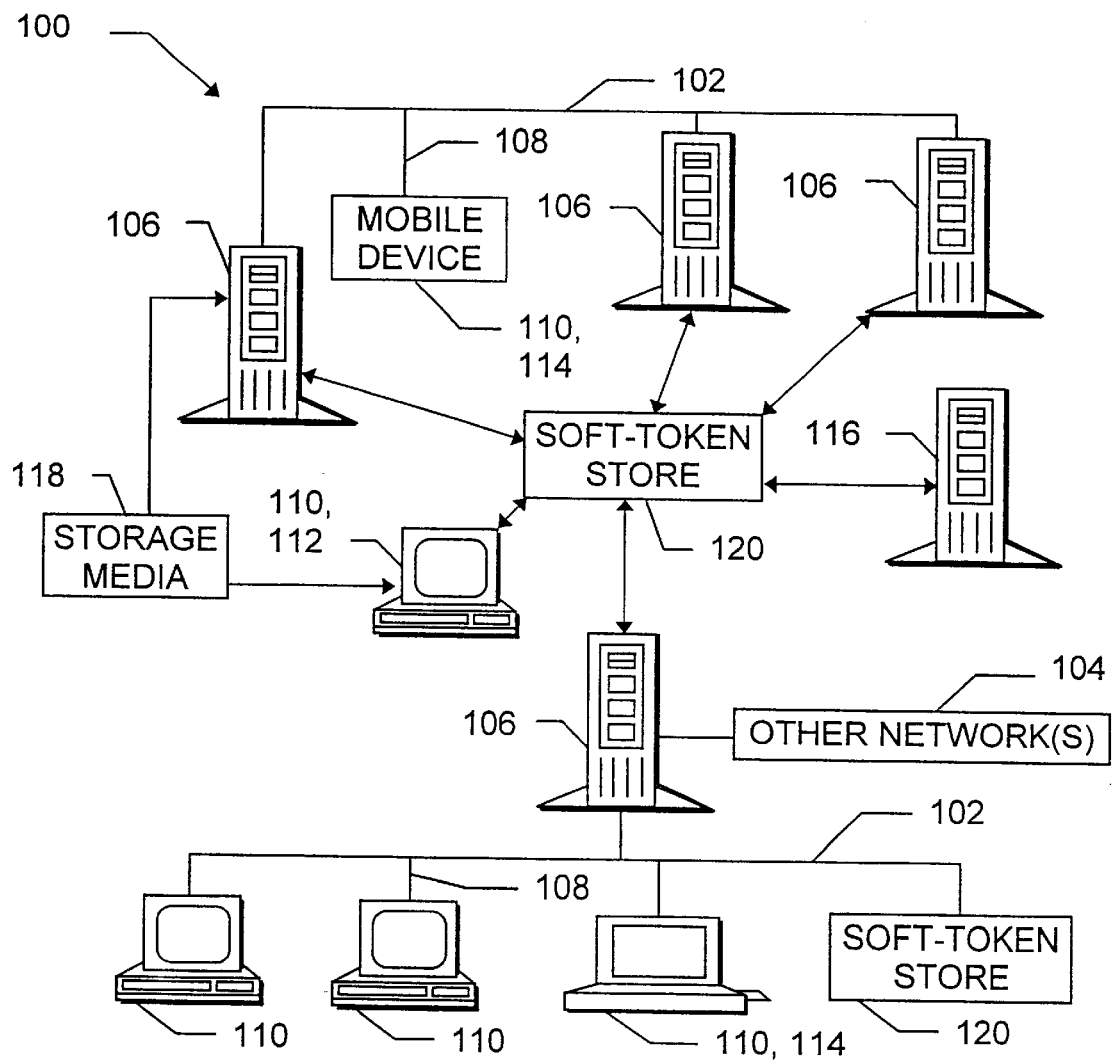
FIG. 1 is a diagram illustrating one of the many distributed environments suitable for use according to the present invention.

The present invention relates to methods, devices, and systems for maintaining a soft-token store in a distributed environment. Suitable distributed environments include, without limitation, local area networks, wide area networks, the Internet, and/or stand-alone computers which communicate through floppies or other removable media.

For convenience, definitions of several terms are provided below. These definitions are further refined by discussion and examples located throughout this document.

"Internet" includes variations such as a private Internet, a secure Internet, a value-added network, a virtual private network, an extranet, or an intranet.

A "network" may include one or more LANs, wide-area networks, Internet servers and clients, intranet servers and clients, peer-to-peer nodes, network operating servers and clients, or a combination thereof.

A "computer" may be a workstation, laptop computer, disconnectable mobile computer, server, mainframe, so-called "network computer" or "thin client", personal digital assistant, another hand-held computing device, "smart" consumer electronics or appliance, or a combination thereof.

A "password" includes one or more individual passwords, pass phrases, biometric scan results (e.g. retinal scan, fingerprint), symmetric key or other cryptographic or digital signature keys, email or other identifying codes, or any other data or device used to protect or control access to an account or another resource in the distributed system.

A "key" is much like a password, and may even be or include a password, but "key" generally refers to something which protects data or another resource and which is in turn protected by a password.

"Current" means a key or password currently in use or recognized for use at a location, as opposed to the term "new" which refers to a key or password proposed for use or recognition and the term "old" which refers to a key or password that was current but has since been replaced or supplemented by a more recent counterpart.

A "password-encrypted-key" is a key which has been encrypted using a password. In some cases the distinction between old, current, and new passwords is the focus while the distinction between old, current, and new keys being protected by the passwords is less central. Thus, a "current-password-encrypted-key" is a key encrypted using a current password; the key may be a current key, a new key, or an old key. Likewise, a "new-password-encrypted-key" is also an encrypted key but the encryption was performed using a new password; as before, the key may be a current key, a new key, or an old key.

In other cases the distinction between old, current, and new keys is the focus while the distinction between old, current, and new passwords is less central. In particular, a "password-encrypted-new-key" is a new key which has been encrypted using a password; the password is typically a current password but this is not always necessary. Likewise, a "password-encrypted-current-key" is an encrypted current key; again, the password used for encryption of the key is typically but not necessarily a current password. "User" may refer to an administrator, or it may refer to a non-administrative "regular" user. Regardless, the user may be either a person or it may be a software task or agent or other computer process acting legitimately on behalf of a person.

Distributed Environment

A portion of one of the distributed environments 100 suited for use with the present invention is shown in FIG. 1. In one embodiment, the system 100 includes Novell NetWare® network operating system software (NETWARE is a registered trademark of Novell, Inc.) and Novell Directory Services software. In alternative embodiments, the computer system 100 includes NetWare Connect Services, VINES, RADIUS, TCP/IP, IPX, NetBEUI, NetBIOS, Windows NT, Windows 98, Windows 95, LAN Manager, and/or LANtastic network operating system software and/or an implementation of a distributed hierarchical partitioned object database according to the X.500 protocol or another directory service protocol such as the Lightweight Directory Access Protocol (VINES is a trademark of Banyan Systems; WINDOWS NT, WINDOWS 95, WINDOWS 98, and LAN MANAGER are trademarks of Microsoft Corporation; LANTASTIC is a trademark of Artisoft). The illustrated system 100 includes two local area networks 102 which are connectable to other networks 104, including other LANs or portions of the Internet or an intranet, through a gateway or similar mechanism. Other embodiments include a single network 102.

As shown, each network 102 includes one or more servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as general file and print servers, as directory service providers, as name servers, as software component servers, or as a combination thereof. The servers 106 may be uniprocessor, multiprocessor, or clustered processor machines. The servers 106 and clients 110 each include an addressable storage medium such as random access memory and/or a non-volatile storage medium such as a magnetic or optical disk, ROM, or flash memory.

Suitable network clients 110 include, without limitation, personal computers 112; laptops, pagers, cell phones, personal digital assistants, and other mobile devices 114; workstations 116; and dumb terminals. The signal lines 108 may include twisted pair, coaxial, or optical fiber cables, telephone lines, satellites, microwave relays, modulated AC power lines, RF connections, and/or other data transmission "wires" known to those of skill in the art. In addition to the network client computers 110, devices such as printers or disk arrays may also be attached to the network 102. A given computer may function both as a client 110 and as a server 106; this may occur, for instance, on computers running Microsoft Windows NT software. Although particular individual and network computer systems and components are shown, those of skill in the art will appreciate that the present invention also works with a variety of other networks, computers, and devices.

The servers 106 and many of the network clients 110 are capable of using floppy drives, tape drives, optical drives or other means to read a storage medium 118. A suitable storage medium 118 includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices.

The physical configuration represents data and instructions which cause the computer system 100 to operate in a specific and predefined manner as described herein. Thus, the medium 118 tangibly embodies a program, functions, and/or instructions that are executable by the servers 106 and/or network client computers 110 to perform soft-token maintenance substantially as described herein. Suitable software and hardware implementations according to the invention are readily provided by those of skill in the art using the teachings presented here and programming languages and tools such as Java, Pascal, C++, C, Perl, VHDL, assembly, firmware, microcode, logic arrays, PALs, ASICs, PROMS, and/or other languages, circuits, or tools.

Soft-Token Store Generally

In particular, the invention may be embodied by including within the system 100 a soft-token store 120 in the form described here. At this point in the description it is important to note several preferred characteristics of the soft-token store. The soft-token store 120 may be kept at a central location, but in many embodiments the soft-token store 120 is distributed such that copies of a token may reside on several different servers 106. This replication gives rise to a need to update the respective copies securely. Detailed discussion of updates to keys and passwords are provided below, and updates to certificates, user information, group definitions, and other token contents can be handled similarly.

A system according to the invention may be tailored according to the needs of particular circumstances. For instance, soft-token keys may be symmetric, public-private, or a mixture of the two types. In addition, the level of security provided may vary. Three of the many possible ways to provide different levels of security include: selecting different algorithms and/or key lengths for encrypting soft-token contents, using or omitting digital signatures on some or all soft-token contents, and using identification methods ranging from simple passwords to biometric scans.

Another characteristic of many systems according to the invention is simplicity of use. Users (including administrators) should be able to update passwords, keys, key certificates, and other soft-token contents without detailed knowledge of the underlying topology of the distributed system. The present invention does not impose any topology, but focuses instead on secure soft-token maintenance. Accordingly, the invention assumes the availability of network and database operations such as communicating over a network, caching data, replicating a database, committing a transaction, rolling back a transaction, maintaining a log, recovering from a system crash, and so forth.

Methods Generally

Figure 2:
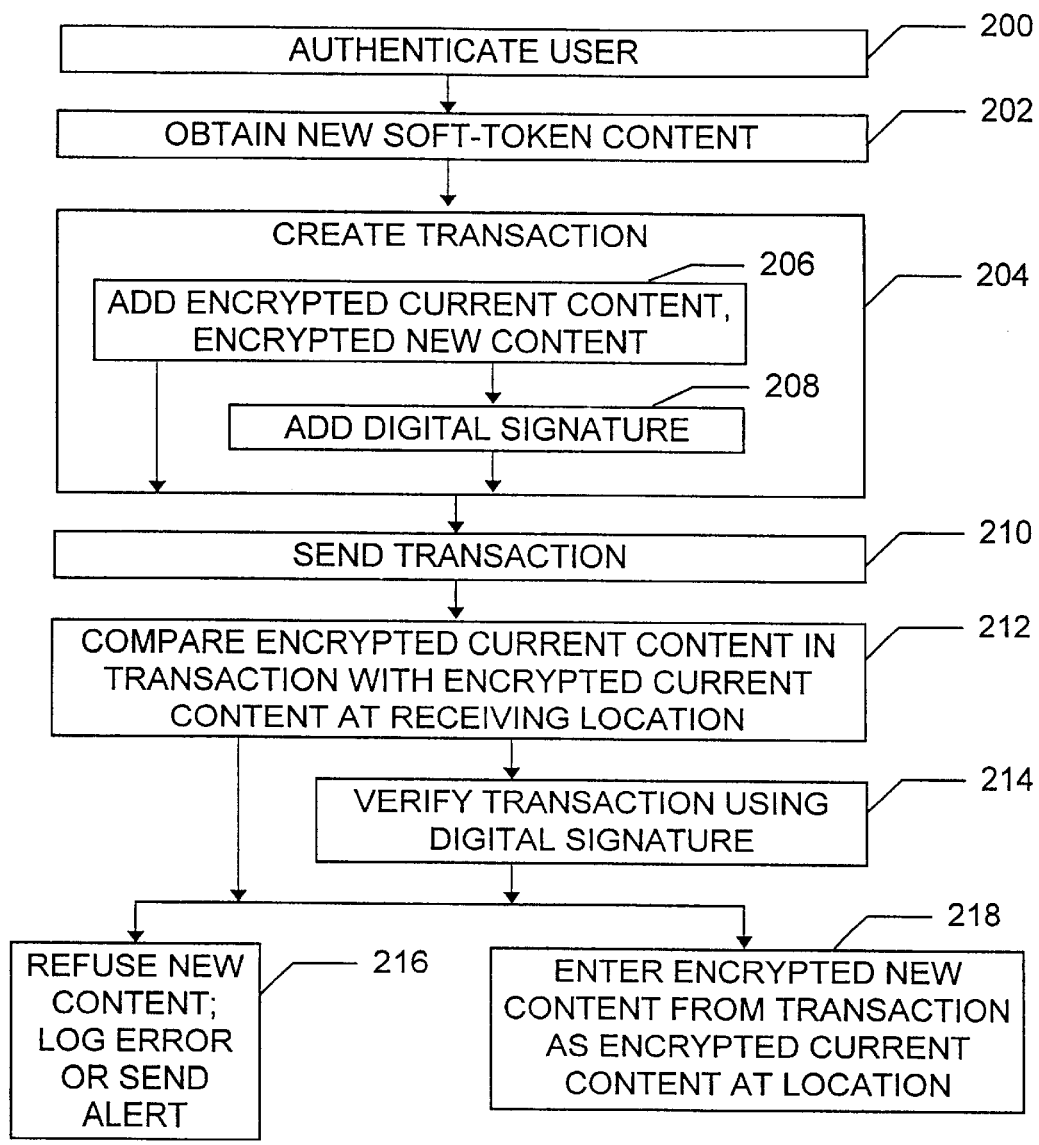
FIG. 2 is a flowchart illustrating generally methods of the present invention for securely updating a soft-token at one location in the distributed environment using a transaction prepared at another location.
Figure 3:
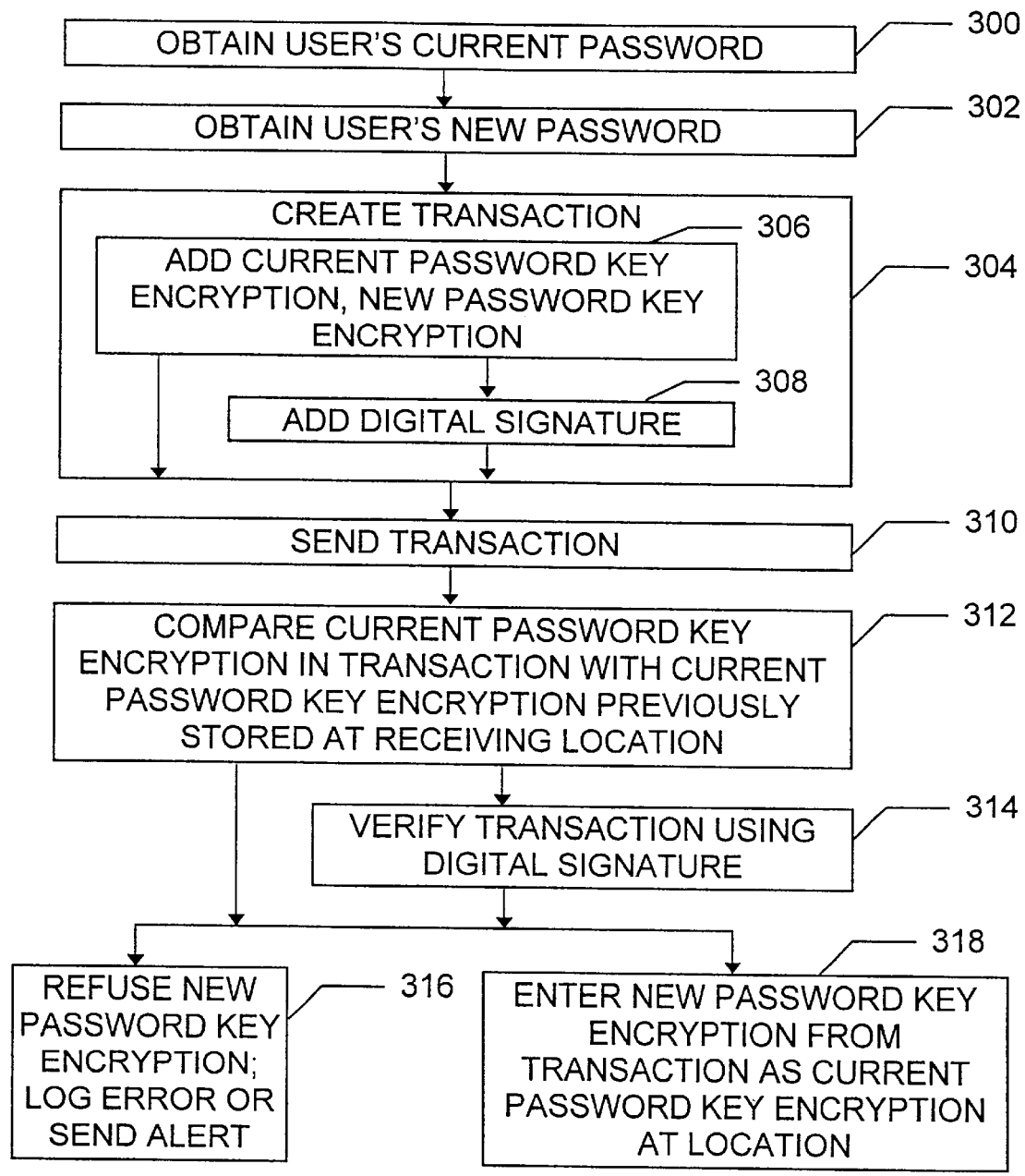
FIG. 3 is a flowchart derived from FIG. 2 further illustrating methods for securely updating a password in a soft-token.
Figure 4:
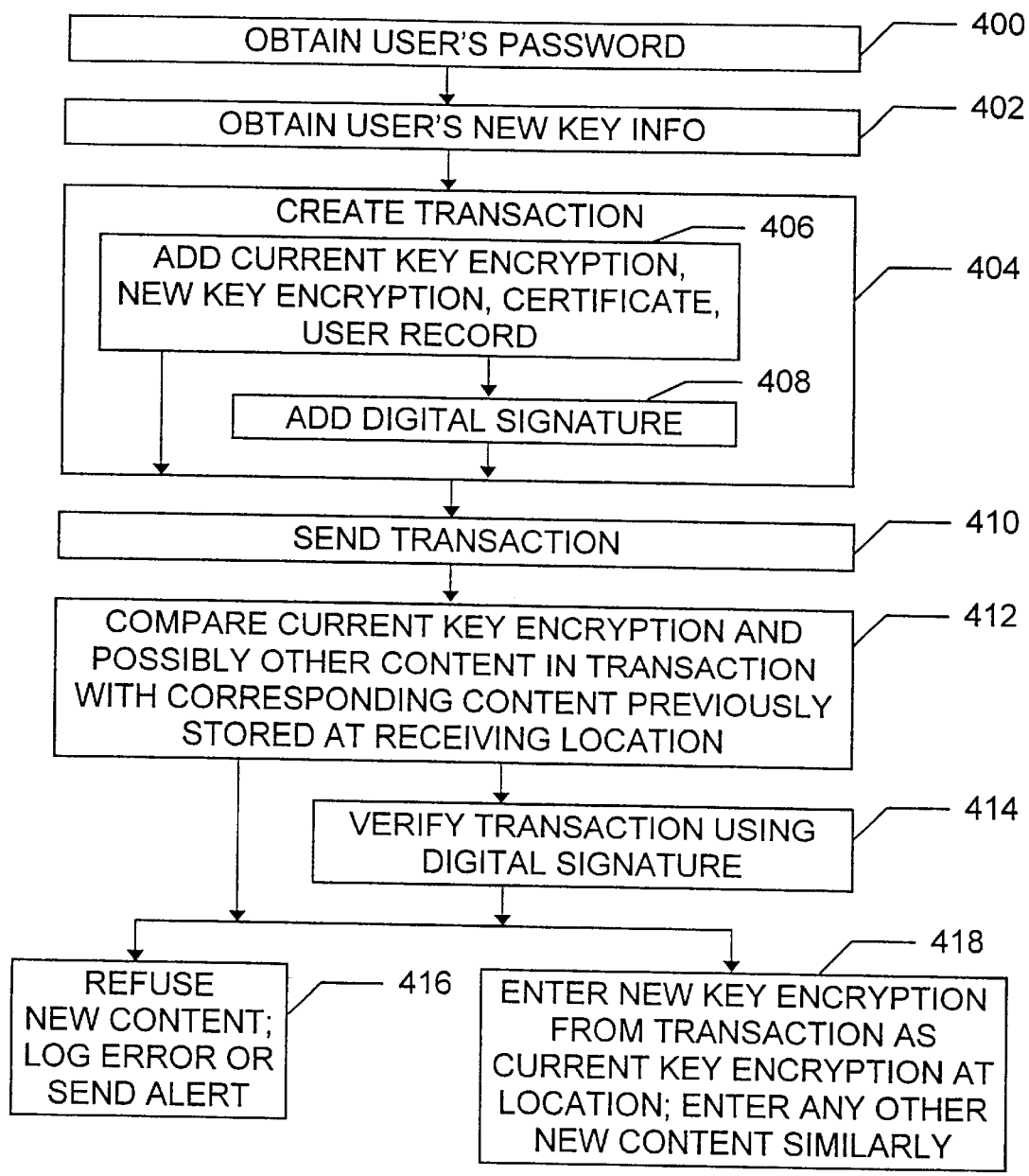
FIG. 4 is a flowchart derived from FIG. 2 further illustrating methods for securely updating a key in a soft-token.

FIGS. 2 through 4 illustrate methods of the present invention. FIG. 2 summarizes methods for maintaining the soft-token store 120 by obtaining new content, sending it in a transaction to a location that may need to be updated, verifying the security of the transaction, and taking action by either entering or refusing to enter the transaction's content. FIG. 3 illustrates such methods as they apply to new passwords, and FIG. 4 illustrates such methods as they apply to new keys. To update both a password and a key, the methods of both FIG. 3 and FIG. 4 are used.

Turning to FIG. 2, an authenticating step 200 first obtains information such as account number(s), user name(s), or other internal identifying information to determine which account(s) will potentially be impacted by the maintenance operation being requested. If the user requesting the maintenance operation is an administrator, one or more accounts may be changed. If the user is a regular user, then typically only that user's individual account will be involved.

The authenticating step 200 also obtains sufficient information, such as an account password, data from a magnetic card, or data from a biometric scan, to determine that the user requesting the change is authorized to make the request.

During a content-obtaining step 202, the distributed environment 100 obtains new soft-token content from the user, in the context of a request that the content either supplement or replace current content. The new content may be a new password, a new key, new user information, new administrative information, or other potential soft-token content.

The content is then placed in a transaction during a creating step 204. In some embodiments the content is provided in encrypted form and a step 206 does not include encryption; in others it does. If the content was not provided in encrypted form, it is encrypted before being placed in the transaction during step 206; alternatively, during step 206 the transaction contents are gathered and then encrypted. Regardless, the content is not sent in plaintext (unencrypted) form from the location 106 that receives it to another location 106 that will be updated. A wide variety of tools and methods for encrypting (and subsequently decrypting) content are known in the art, including without limitation those described in Applied Cryptography by Bruce Schneier and other references.

During an optional signing step 208, a digital signature is generated and added to the transaction. The digital signature assures the integrity of the new content added during step 206, the implicit or explicit "update" request, and any other critical transaction contents. A wide variety of tools and methods for generating (and subsequently verifying) digital signatures are known in the art, including without limitation those described in Applied Cryptography by Bruce Schneier and other references.

During a sending step 210, the transaction is transmitted to one or more other locations 106 to allow updates of the soft-token store 120 at those locations. The sending step 210 may involve logging, handshaking, retransmission, shared memory access, and other familiar network or distributed system communication protocols known in the art.

During a comparing step 212, the encrypted content in the transaction is compared to the corresponding content at the location being updated, to help determine whether the content in the transaction should be accepted at the update location. Comparison for equivalence may involve testing for exact, bit-by-bit equality. Comparison may also involve tests for equivalence, such as whether a source address or a timestamp lies within a predetermined range. During a verifying step, the transaction's digital signature is verified. The comparing step 212 and the verifying step 214 may be performed in the order shown, in the opposite order, or concurrently. Either of the steps 212, 214 may be omitted in a given embodiment, but using both steps increases the level of security provided.

The result(s) of the comparing and/or verifying steps lead either to a refusal to accept the new content or entry of the new content at the update location. In one embodiment, if the comparing step 212 finds equality and the verifying step 214 deter-mines that the transaction was not been tampered with or replaced after being created, then the encrypted new content from the transaction is entered during a step 218 as the encrypted current content at the update location 106. Entry may be accomplished by replacing (overwriting) the location content with content from the transaction, or by moving the location content into an archive of old location contents and designating transaction content as the current location content.

In this embodiment, refusal of the new content during a step 216 may occur as the result of either (a) failure to find equality during the comparing step 212 or (b) failure to generate at the update location a message digest that matches the transaction digital signature during the verifying step 214. If the new content is refused, corresponding additional steps may be taken. For instance, the transaction, arrival time, and basis for refusing entry (such as failure of step 212 and/or step 214) could be logged and/or sent in an alert to a system administrator.

Password Updates

FIG. 3 illustrates the methods of FIG. 2 as they apply when the new content is a new password. An obtaining step 300 proceeds as step 200 above to obtain the user's current password and authenticate the user. An obtaining step 302 then obtains new soft-token content in the form of a new password.

A creating step 304 and constituent steps 306, 308 create a transaction much as corresponding steps 206, 208 above, with the encrypted current content in the transaction being a current-password-encrypted-key and the encrypted new content being a new-password-encrypted-key. The current-password-encrypted-key is formed by encrypting the key using the current password, and the new-password-encrypted-key is formed by encrypting the key using the new password. A sending step 310 proceeds as sending step 210 above.

A comparing step 312 compares transaction content with soft-token content previously stored at the update location much as the comparing step 212 above. In step 312, the comparison is made between the current-password-encrypted-key in the transaction and the current-password-encrypted-key previously stored at the update location. A verifying step 314 proceeds as verifying step 214 above. Finally, a refusing step 316 and an entering step 318 proceed much as their counterparts 216 and 218 above.

Key Updates

Like the methods illustrated in FIG. 3, the methods illustrated in FIG. 4 are derived from those shown in FIG. 2. In the methods of FIG. 4, however, a new key rather than a new password is encrypted, added to a transaction, transmitted to an update location, compared and/or verified, and either refused or entered in the soft-token store 120 at the update location. The password-encrypted-current-key noted in steps 406 and 412 is formed by encrypting the current key using the password, and the password-encrypted-new-key noted in steps 406 and 418 is formed by encrypting the new key of step 402 using the user's password.

The "new key info" noted in step 402 may include a new key alone, or it may also include one or more certificates which can be used to verify the new key. Suitable certificates include, without limitation, certificates issued by a certification authority. A "certification authority" may be such a dedicated and/or centralized certification authority of the type found in a public key infrastructure, or it may be an alternative certification authority such as a member of a PGP (Pretty Good Privacy encryption infrastructure) or other web of trust.

Alternatives

Although specific examples are given, those of skill will appreciate that other embodiments are possible. For instance, the method steps illustrated and discussed here may be performed in various orders, except in those cases in which the results of one step are required as input to another step. In particular, the order of each comparing step 212, 312, 412 and its corresponding verifying step 214, 314, 414 may be reversed from the order illustrated. Steps may also be omitted unless called for in the claims, regardless of whether they are expressly described as optional in this Detailed Description.

In addition, steps may be repeated or combined. For instance, steps 210 through 218 could be repeated to update several locations 106 without repeating steps 200 through 208 for each location. As another example, the following steps may be used to update both a password and a key: 300/400; 302; 402; 304/404 using 306, 406, and optionally 308/408; 310/410; 312; 412; optionally 314/414; (316 or 318) and (416 or 418). Steps may also be named differently. Similar observations apply to the elements of system or storage medium claims.

Means for performing the method steps include computers configured with software or special-purpose hardware to accomplish the functions described. By way of example and not limitation, means for authenticating users include keyboards and other means for obtaining passwords; means for obtaining new soft-token content include memory transfers, disk reads, and other data transfer mechanisms; means for sending transactions include network transmission protocols, "wires," routers, and the like; and the means for verifying, comparing, determining whether to refuse new content, and entering new content include software written in Java, C++, or other languages, operating to control microprocessors and other computer hardware.

Soft-Token Store Components

Figure 5:
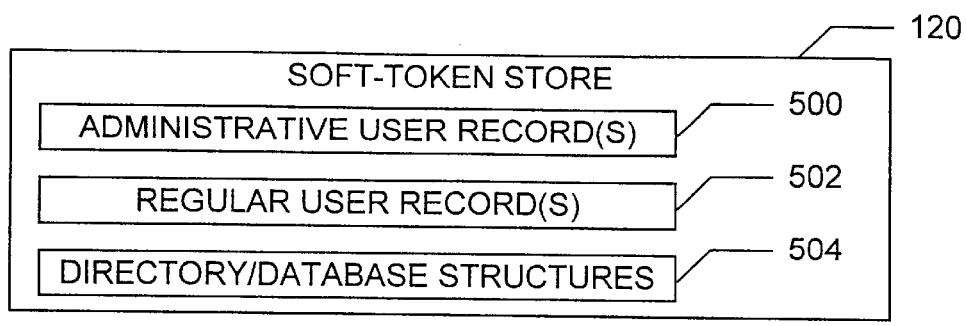
FIG. 5 is a diagram illustrating the content of a soft-token store according to the present invention, including one or more user records.
Figure 6:
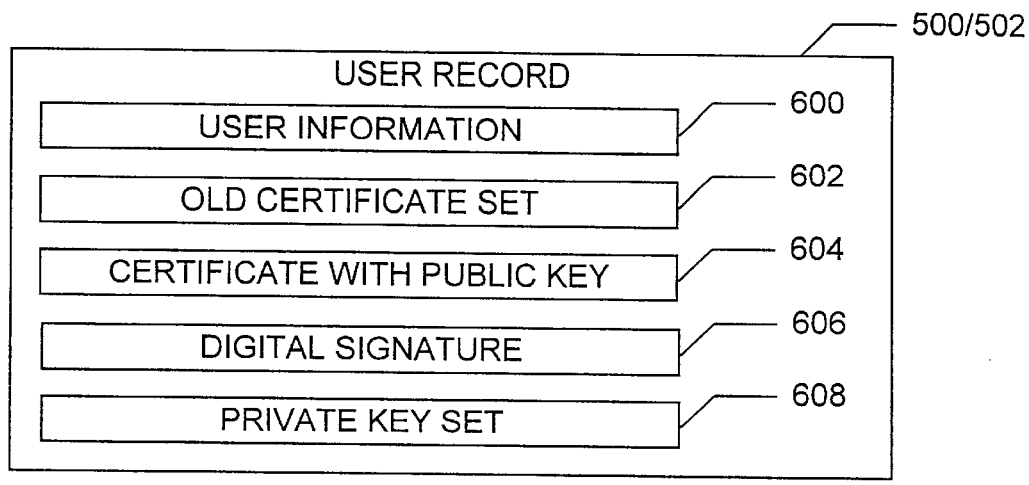
FIG. 6 is a diagram further illustrating the user records shown in FIG. 5.

FIGS. 5 and 6 illustrate the structure and content of the soft-token store 120. The keys, passwords, user information, and other soft-token information is arranged in user records. Administrative user records 500 contain soft-token information associated with network or other computer system administrators who have responsibility for, and authority over administrative aspects of, both their own accounts and the accounts of non-administrative users. Regular user records 502 contain soft-token information associated with non-administrative users, who have responsibility and authority for only their individual accounts.

The soft-token store 120 may contain zero or more administrative user records 500 and zero or more regular user records 502. Of course, the store 120 is of little use except as a placeholder if no records of either type are present. Examples of each type of user record 500, 502 are provided below in connection with FIG. 6.

The soft-token store 120 also contains directory and/or database structures 504. These structures 504 assist partitioning, replicating, searching, and similar operations, and may be implemented using techniques familiar to those skilled in the database and/or directory arts. For example, in one embodiment the structures 504 include an index or hash table which allows software according to the invention to rapidly obtain the network address of every location 106 in the distributed environment 100 that contains a copy of a particular user record 500/502. Likewise, in one embodiment the structures 504 include a log, including checkpoints, which tracks committal of update transactions and allows an authorized administrator to roll back an interrupted or unauthorized set of updates.

Components of user records 500, 502 are illustrated in FIG. 6. One administrative user record embodiment 500 includes a user information component 600, an old certificate set 602, a certificate containing a public key 604, a digital signature 606, and a private key set 608. One regular user embodiment 502 also contains these components, with different data tailored to different uses. Each of these two embodiments will now be described in detail; it will be appreciated that other embodiments may omit one or more of the illustrated components or add other components.

In the administrative user record 500, the user information 600 includes data such as the administrator's name, a list of other administrators and contact information (email address, telephone number), and enterprise information such as the name and address of the business which is responsible for the soft-token store 120.

The old certificate set 602 includes certificates that were previously used in administration of the soft-token store 120, and their service history (time and date entered and removed from service, administrator responsible). This allows authentication of past transactions.

The certificate 604 contains the public key used to administer the soft-token store 120. The certificate 604 may be obtained from a certification authority, if the certification authority's public key is available to authenticate the certificate 604.

The digital signature 606 signs at least the user information 600 and the old certificate set 602. This digital signature 606 can be created with any private key which is sufficiently protected from compromise if the corresponding public key is available to authenticate the signature 606.

The private key set 608 in the administrative user record 500 contains an encrypted copy of the private key(s) used to administrate the soft-token store 120; normally one key would be present for each administrator. The keys in the key set 608 may be encrypted using any suitable method, including without limitation DES or triple-DES.

In the regular user record 502, the user information 600 includes data such as the user's name, context in the distributed environment 100 and/or the enterprise, and contact information.

The old certificate set 602 includes certificates that were previously used by the user and their service history, to allow authentication of past transactions.

The certificate 604 contains the user's public key. The certificate 604 may be obtained from a certification authority, if the certification authority's public key is available to authenticate the certificate 604.

The digital signature 606 signs at least the user information 600 and the old certificate set 602. This digital signature 606 is created with the private key corresponding to the user's public key in the certificate 604.

The private key set 608 in the regular user record 502 contains an encrypted copy of the user's private key(s); typically only one key is present. The key may be encrypted using any suitable method, including without limitation DES or triple-DES.

Some alternative embodiments of the user records 500, 502 omit the old certificate set 602. Some embodiments use symmetric keys, essentially combining components 604 and 608, instead of public-private key pairs. Some embodiments form the digital signature 606 including different parts of the user record 500 or 502; others form the signature 606 using all parts of the user record 500 or 502.

Example

To further illustrate the invention, another example will now be provided. This example is not the only possible use of the invention, and embodiments not discussed in the example also lie within the scope of the claims.

Assume that administration of the distributed environment is the responsibility of several administrators, that a single administration private-public key pair is used by the administrators in their official duties, and that each administrator has a copy of the private key which is encrypted with a symmetric key known only to that administrator. The goal is for an administrator we shall call "Able" to securely change both the administration private key and the corresponding public key certificate. Because Able does not know the symmetric keys of the other administrators, Able cannot simply give them encrypted copies of the new private key.

To solve this problem, we proceed as follows. First, we temporarily modify the administrative user record 500 of a given administrator. Before the modification, the record 500 includes administrator information 600, old certificates 602, the certificate 604 containing the administration public key, the digital signature 606 signing the preceding three data items, and the administrator's private key set 608. The key sey 608 contains each administrator's encrypted copy of the administration private key, encrypted with that administrator's symmetric key.

Administrator Able provides Able's current password during step 200 and provides the new administration certificate and corresponding private key during step 202. The new administration keys are tested for validity during step 202; this may be done by an operation as simple as encrypting a known value with one key and decrypting it with the other to see if the results are equal.

The transaction creating step 204 is supplemented by the following steps. A new administrative user record 500 is created by moving the current certificate 604 to the old certificate set 602 and making the new certificate the current certificate 604 in the new record 500. Thus, the digital signature 606 in the new record 500 signs the administrator information 600, the certificate set 602 which includes the previous current certificate, and the new certificate 604. The new private key is then encrypted using Able's password and added to the new record 500 to replace Able's old encrypted private key in the key set 608. A copy of the new private key encrypted with a very secure symmetric key, a copy of that symmetric key encrypted with the old private key, and a new key status set are then added, so the new record 500 has the following contents:

Administrator information
Old certificate set
   Previous current certificate
   Old certificate 1
   Old certificate 2
   . . .
   Old certificate m -continued New certificate containing administration public key
Digital signature signing above three items
New private key encrypted with a very secure symmetric key
Above symmetric key encrypted with the old administration
private key
Administrator's private key set with each private key encrypted by
password unique to that administrator
    Old private key encrypted with administrator Pat's password
    New private key encrypted with administrator Able's password
    Old private key encrypted with administrator Bobby's password
    . . .
    Old private key encrypted with administrator N's password
Administrator's private key change status set
    administrator Pat (pending)
    administrator Able (done)
    administrator Bobby (pending)
    . . .
    administrator N (pending)

The key change status set may be implemented as bitflags, as a list or an array, or by other means readily identified by those of skill in the art.

During step 204, a transaction is created from the current administrative user record 500, current encrypted administration private key, new record 500, new private key encrypted with the password, and a digital signature using the old administration private key. During step 210 copies of the transaction are sent to all involved nodes.

Each receiving node 106 receives the transaction and verifies the digital signature during step 214 using the administration public key in the local replica of the soft-token store 120. During step 212 the old record 500 in the transaction is compared with the current record 500 at the node being updated. The new record 500 is either refused or entered at the update location during steps 216 or 218, respectively.

If an administrator's status is pending when the administrator accesses the new key set 608, then the following occurs. The administrator provides his or her current password. The password is used to decrypt the old private key in the key set 608. The private key is used to decrypt the symmetric key that protects the new private key. The new private key is decrypted. The new private key is re-encrypted, but this time the accessing administrator's password is used. The new encrypted private key is put in the key set 608, and the administrator's status is changed from pending to done.

Conclusion

In many distributed environments it is not cost-effective, reliable, and efficient to store keys at a single location. The present invention provides improved tools for maintaining a soft-token store, and in particular, the invention provides tools for updating keys and passwords in a distributed environment in a public key infrastructure. If a user changes the password or key at one location, the invention updates other locations without unacceptable security risks. Key pairs can be securely distributed and updated, regardless of network topology, because updates can be made without sending unencrypted keys over the network.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific and organizational principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for maintaining a soft-token store in replicas in a distributed environment rather than at a central location, the method tailored for updating a password which limits access to a key stored in the distributed environment, the method comprising the steps of:

authenticating a user, wherein the authenticating step comprises obtaining a user's current password;

obtaining from the user a new password for the user;

creating a transaction which includes at least a current-password-encrypted-key formed by encrypting the key using the current password and a new-password-encrypted-key formed by encrypting the key using the new password;

sending the transaction to a server at an update location in the distributed environment which does not yet recognize the new password, the server storing a local replica which is one of a plurality of replicas of the soft-token store in the distributed environment;

determining whether to refuse the new password based on information in the transaction, wherein the determining step comprises comparing the current-password-encrypted-key in the transaction with a current-password-encrypted-key previously stored at the update location to determine whether they are equivalent; and entering the new-password-encrypted-key into the local replica of the soft-token store at the update location so that the new password will be recognized there if the comparing step determines that the compared current-password-encrypted-keys are equivalent.

2. The method of claim 1, wherein the transaction also includes a digital signature based on at least the current-password-encrypted-key and the new-password-encrypted-key, and the method further comprises authenticating the transaction at the update location using the digital signature.

3. The method of claim 1, wherein the entering step replaces the current-password-encrypted-key at the update location with the new-password-encrypted-key from the transaction.

4. The method of claim 1, wherein the key is a symmetric key.

5. The method of claim 1, wherein the transaction also includes a certificated set, the method further comprises comparing the certificate set in the transaction with a certificate set previously stored at the update location to determine whether they are equivalent, and the entering step enters the new-password-encrypted-key at the update location if the current-password-encrypted-key comparing step determines that the compared current-password-encrypted-keys are equivalent and the certificate set comparing step also determines that the compared certificate sets are equivalent.

6. The method of claim 5, wherein the transaction also includes a digital signature based on at least the current-password-encrypted-key, the new-password-encrypted-key, and the certificate set, and the method further comprises authenticating the transaction at the update location using the digital signature.

7. The method of claim 6, wherein the key is a private key having a corresponding public key.

8. The method of claim 7, wherein the digital signature is formed using the private key, and wherein the authenticating step uses the public key and the digital signature to authenticate the transaction.

9. The method of claim 7, wherein the certificate set includes a certificate and the method further comprises using the certificate to authenticate the public key.

10. The method of claim 9, wherein the certificate was provided by a certification authority in a public key infrastructure, and the step of using the certificate to authenticate the public key includes verifying a digital signature on the certificate using a public key of the certification authority.

11. The method of claim 9, wherein the certificate set contains at least one former certificate for use in authenticating past digital signatures.

12. A computer system comprising:
   a distributed environment containing at least two computers at respective locations, each computer comprising a processor and a memory;
   an authenticating means which obtains a user's current password;
   an obtaining means which obtains a new password for the user at a first location in the distributed environment;
   a creating means which creates a transaction that includes at least a current-password-encrypted-key formed by encrypting the key using the current password and a new-password-encrypted-key formed by encrypting the key using the new password;
   a sending means which sends the transaction to an update location in the distributed environment that does not yet recognize the new password;
   a determining means which compares the current-password-encrypted-key in the transaction with a current-password-encrypted-key previously stored at the update location to determine whether they are equivalent; and
   an entering means which enters the new-password-encrypted-key at the update location, so the new password will be recognized there, if the determining means determines that the compared current-password-encrypted-keys are equivalent.

13. The system of claim 12, wherein the transaction also includes a digital signature based on at least the current-password-encrypted-key and the new-password-encrypted-key, and the system further comprises a verifying means for verifying the transaction at the update location by verifying the digital signature.

14. The system of claim 12, wherein the transaction also includes a certificate set and a digital signature based on at least the current-password-encrypted-key, the new-password-encrypted-key, and the certificate set, wherein the system further comprises a verifying means for verifying the transaction at the update location by verifying the digital signature, wherein the determining means compares the certificate set in the transaction with a certificate set previously stored at the update location to determine whether they are equivalent, and wherein the entering means enters the new-password-encrypted-key at the update location if the compared current-password-encrypted-keys are equivalent and the compared certificate sets are equivalent.

15. The system of claim 12, wherein the sending means comprises a network communication link.

16. The system of claim 15, wherein the network communication link utilizes a TCP/IP protocol.

17. A computer storage medium having a configuration that represents data and instructions which will cause at least a portion of a computer system to perform method step for maintaining a soft-token store in a distributed environment, the method comprising the steps of:
   authenticating a user, wherein the authenticating step comprises obtaining a user's current password;
   obtaining from the user a new password for the user;
   creating a transaction which includes at least a current-password-encrypted-key formed by encrypting the key using the current password and new-password-encrypted-key formed by encrypting the key using the new password;
   sending the transaction to a server at an update location in the distributed environment which does not yet recognize the new password, the server storing a local replica which is one of a plurality of replicas of the soft-token store in the distributed environment;
   determining whether to refuse the new password based on information in the transaction, wherein the determining step comprises comparing the current-password-encrypted-key in the transaction with a current-password-encrypted-key previously stored at the update location to determine whether they are equivalent; and
   entering the new-password-encrypted-key into local replica of the soft-token store at the update location so that the new password will be recognized there if the comparing step determines that the compared current-password-encrypted-keys are equivalent.

18. The configuration storage medium of claim 17, wherein the transaction also includes a digital signature based on at least the current-password-encrypted-key and the new-password-encrypted-key, and the method further comprises authenticating the transaction at the update location using the digital signature.

19. The configured storage medium of claim 17, wherein the entering step replaces the current-password-encrypted-key at the update location with the new-password-encrypted-key from the transaction.

20. The configured storage medium of claim 17, wherein the key is a symmetric key.

21. The configured storage medium of claim 17, wherein the transaction also includes a certificate set, the method further comprises comparing the certificate set in the transaction with a certificate set previously stored at the update location to determine whether they are equivalent, and the entering step enters the new-password-encrypted-key at the update location if the current-password-encrypted-key comparing step determines that the compared current-password-encrypted-keys are equivalent and the certificate set comparing step also determines that the compared certificate sets are equivalent.

22. The configured storage medium of claim 21, wherein the transaction also includes a digital signature based on at least the current-password-encrypted-key, the new-password-encrypted-key, and the certificate set, and the method further comprises authenticating the transaction at the update location using the digital signature.

23. The configured storage medium of claim 22, wherein the key is a private key having a corresponding public key.

24. The configured storage medium of claim 23, wherein the digital signature is formed using the private key, and wherein the authenticating step uses the public key and the digital signature to authenticate the transaction.

25. The configured storage medium of claim 23, wherein the certificate set includes a certificate and the method further comprises using the certificate to authenticate the public key.

26. The configured storage medium of claim 25, wherein the certificate was provided by a certificate authority in a public key infrastructure, and the step of using the certificate to authenticate the public key includes verifying a digital signature on the certificate using a public key of the certification authority.

27. The configured storage medium of claim 25, wherein the certificate set contains at least one former certificate for use in authenticating past digital signatures.

* * * * *

UNITED STATES PATENT AND TRADEMARK OFFICE
CERTIFICATE OF CORRECTION

PATENT NO. : 6,760,843 B1  
DATED : July 26, 2004  
INVENTOR(S) : Stephen R. Carter Page 1 of 1

It is certified that error appears in the above-identified patent and that said Letters Patent is hereby corrected as shown below:

<u>Title page,</u>  
Item [57], ABSTRACT,  
Line 5, "new ocation" should read -- new location --.

<u>Column 2,</u>  
Line 50, "environ-ment" should read -- environment --.

<u>Column 7,</u>  
Line 3, "deter-mines" should read -- determines --.

Signed and Sealed this

Fifth Day of April, 2005

JON W. DUDAS  
*Director of the United States Patent and Trademark Office*